United States Patent [19]

Landis

[11] Patent Number: 4,736,402
[45] Date of Patent: Apr. 5, 1988

[54] SIGNALING ARRANGEMENT

[75] Inventor: Edward W. Landis, Holmdel, N.J.

[73] Assignees: American Telephone and Telegraph Company; AT&T Information Systems Inc., both of Murray Hill, N.J.

[21] Appl. No.: 35,129

[22] Filed: Apr. 6, 1987

[51] Int. Cl.$^4$ .................... H04B 3/46; H04B 17/00
[52] U.S. Cl. ............................ 379/16; 379/18; 375/10
[58] Field of Search ............ 379/18, 16, 23, 22; 178/69 R, 69 N, 69 A, 69 G; 370/14; 371/22; 375/10

[56] References Cited

U.S. PATENT DOCUMENTS 4,064,459 12/1977 Markwitz et al. .................... 325/67
4,095,045 6/1978 Johnson et al. ........................ 178/2
4,255,625 3/1981 Walton et al. ........................ 379/18

FOREIGN PATENT DOCUMENTS 1401575 7/1975 United Kingdom .

OTHER PUBLICATIONS

Warren R. Moe, Leslie E. Morton, and Gerd W. Printz, "Accunet TM Switched 56 Is Providing Switched Digital Transmission Now," Record, Sep. 1985, pp. 26-30.
W. Douglas Hutcheson and T. M. Snyder, "Design and Deployment of Control Services Based on Digital Cross-Connect Systems," 1985 IEEE, pp. 562-566.
Digital Data System Data Service Unit Interface Specification, Bell System Technical Reference, PUB 41450, 326-186, Nov. 1981.
Special Access Connections to the AT&T Communications Network for New Service Applications, AT&T Technical Reference, PUB 41458, 326-204, Oct. 1985.

Primary Examiner—Stafford D. Schreyer
Attorney, Agent, or Firm—Frederick B. Luludis

[57] ABSTRACT

An interface unit connected to one end of a communication path is arranged to conduct a transmission test of the path before exchanging information with an interface unit connected to the other end of the path and to signal the results of the test by terminating the test when the results show an absence of transmission errors and continuing the test when the results show the presence of such errors, the test being the transmission and reception of a predefined sequence of signals.

9 Claims, 5 Drawing Sheets

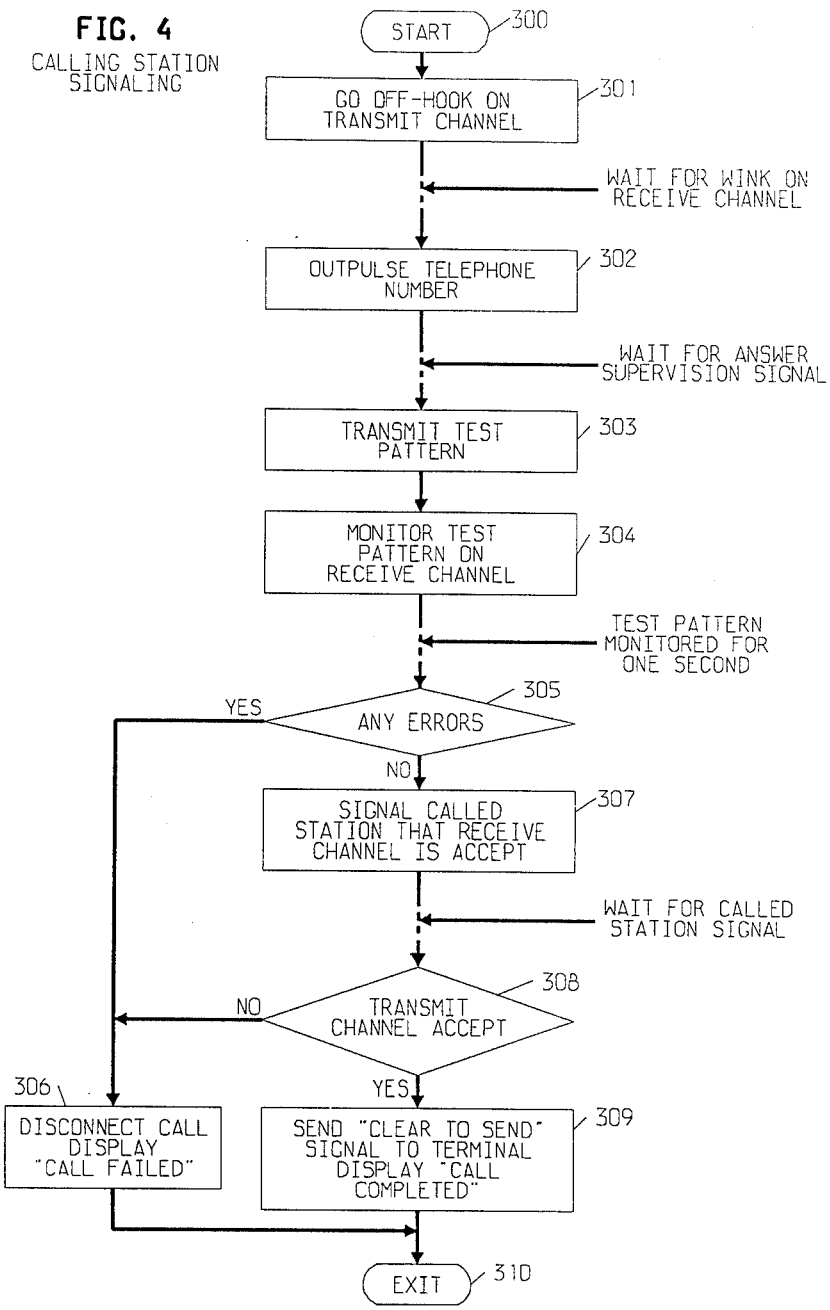

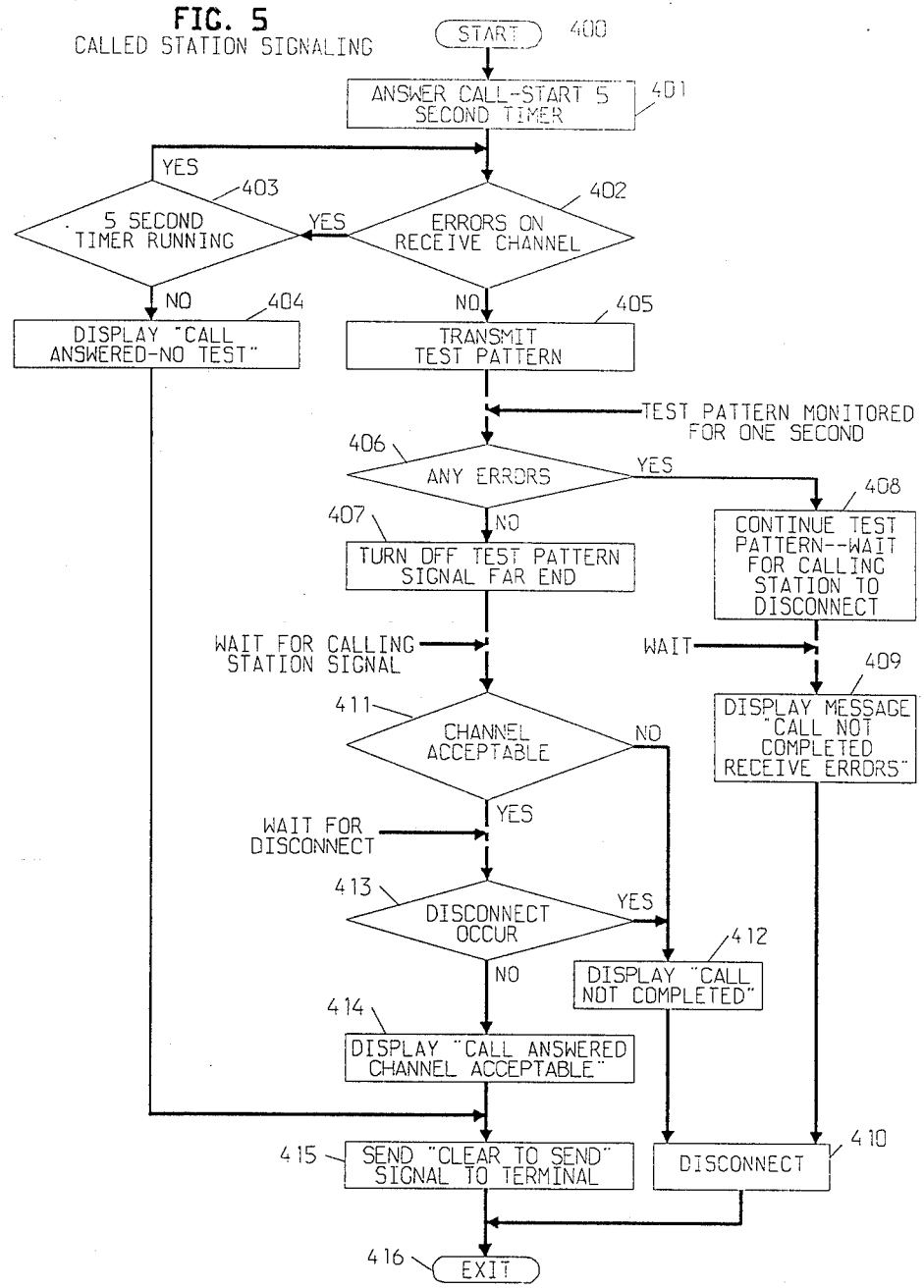

SIGNALING ARRANGEMENT

FIELD OF THE INVENTION

The invention relates to a signaling arrangement which controls the transmission of a predefined sequence of signals to provide an indication as to the transmission quality of a communication path.

BACKGROUND OF THE INVENTION

Some prior communication devices when connected to respective ends of a communication path are arranged to test the transmission quality of the path and to exchange signaling information indicative of the results of their respective tests before they exchange data or information. Such prior devices may employ a secondary transmission channel that is either time- or frequency-separated from a primary channel for the exchange of such signaling information. However, in those prior arrangements which do not have secondary-channel capability, only one of the communication devices typically performs the transmission test. The one device typically does this by transmitting a command to establish a loop-back path at the other device and then transmitting one or more predefined code words. The device then compares the code words with the signals that it receives via the loop-back path. If the code words and received signals match, then the one device transmits a command to disconnect the loop-back path and then begins its transmission of data or information. Otherwise, the one device disconnects the loop-back path, as mentioned above, and disconnects itself from the path without notifying (signaling) the other device of its findings. While such arrangements appear to achieve the desired result of testing the communication path and of signaling the results thereof without making use of a secondary channel, they nevertheless consume an inordinate amount of time establishing the loopback path and performing the transmission test.

SUMMARY OF THE INVENTION

In my arrangement, each circuit connected to a communication path is arranged to concurrently test the transmission quality of the path and to send to the other a signal indicative of its respective test results. Specifically, each circuit is arranged to transmit a predefined sequence of signals and to monitor the sequence of signals that it receives from the other circuit. If a circuit finds that the sequence of signals that it receives does not contain a transmission error over a predetermined period of time, it signals that fact to the other circuit by terminating its transmission of the sequence of signals. If, on the other hand, the circuit finds that the received sequence does contain such an error, it signals that fact to the other circuit by either continuing its transmission of the sequence if the circuit happens to be the so-called "called station" or disconnecting itself from the communication path if the circuit happens to be the so-called "calling station".

BRIEF DESCRIPTION OF THE DRAWING

In the drawing,

FIGS. 4 and 5 are flow charts depicting the operation of the interface unit of FIG. 3 in relation to inter alia, signaling another interface unit in accordance with the invention.

DETAILED DESCRIPTION

The invention will be discussed in the context of a switched digital communication network, such as AT&T's ACCUNET Switched 56 digital data service, in which a digital communication path between digital devices is established similar to the way a regular telephone call is established. The ACCUNET Switched 56 digital data service is discussed in an article entitled "ACCUNET Switched 56 is providing switched digital transmission now", by R. M. Moe et al, published in AT&T Bell Laboratories' RECORD, September, 1985, pp.26–30, which is hereby incorporated by reference.

Figure 1:
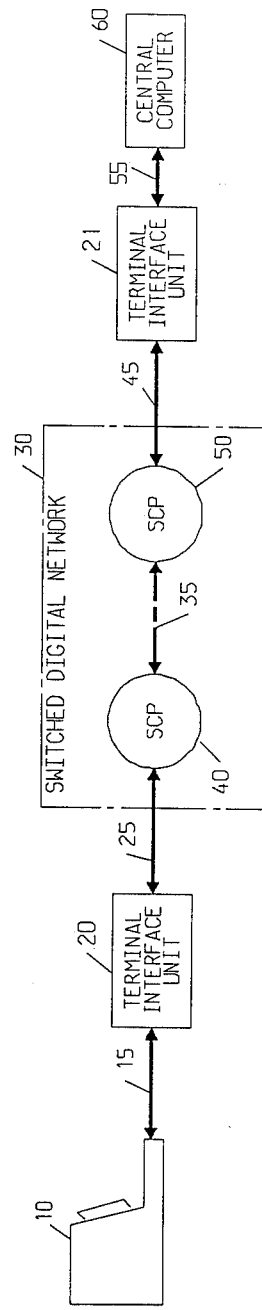
FIG. 1 is a block diagram of a digital communication network in which the invention is illustratively practiced.

Referring to FIG. 1, there is shown terminal 10 connected to one end of switched digital communication network 30 via terminal interface unit 20 and communication path 25. In addition, central computer, or terminal, 60 is connected to the other end of the network via interface unit 21 and communication path 45. The establishment of a path through network 30, for example, path 35, may be initiated by a user located at either end of network 30. For the purpose of discussing the embodiment, it will be assumed herein that path 35 is established by a user located at terminal 10. That is, terminal 10 is the so-called "calling" station and terminal 60 is the so-called "called" station.

The aforementioned communication paths 25 and 45 each comprise a four-wire, full-duplex communication path to Switching Control Points (SCPs) 40 and 50, respectively. In the four-wire paths, two of the wires comprise a channel for transmitting data from interface units 20 and 21 to SCPs 40 and 50, respectively, and the remaining wires comprise a channel for transmitting data in the opposite direction. The data is in the form of digital signals, as discussed below.

Terminal interface units 20 and 21 are identical to one another and, therefore, a discussion of either unit pertains equally well to the other unit.

Terminal interface unit 20 illustratively includes a computer with internal RAM, EEPROM and ROM circuits, dial pad, display, transmitting and receiving circuits as well as other internal components not explicitly shown in FIG. 1. Unit 20 may be arranged to present a CCITT V.35, appendix 4 interface to terminal 10.

Data transmitted and received over path 25 is encoded in the well-known bipolar return-to-zero format, in which a binary one is represented by either a positive or negative pulse, e.g., +1 or −1 volts, and a binary zero is represented by the absence of a pulse, e.g, zero volts. The bipolar encoding follows a so-called bipolar rule which requires that when a binary one is encoded as a positive pulse, the next binary one must be encoded as a negative pulse, and viceversa.

A violation of the aforementioned bipolar encoding rule is employed to provide a convenient way of exchanging supervisory signals between unit 20 and SCP 40. For example, when unit 20 is in an idle state, i.e., on-hook, it transmits to SCP 40 a predefined pattern of bipolar signals containing a bipolar violation. SCP 40 acknowledges the on-hook state by returning a similar pattern of signals. This on-hook signaling arrangement will hereinafter be referred to as Control Mode Idle (CMI) signaling. A request for service, i.e., an off-hook state, is represented by an absence of a bipolar violation in the stream of signals that unit 20 transmits to SCP 40. This latter off-hook signaling arrangement will hereinafter be referred to as Data Mode Idle (DMI) signaling. SCP 40 acknowledges a request for service by returning a "wink" signal to unit 20, the wink signal being generated by momentarily changing the CMI signaling that SCP 40 is sending to unit 20 to DMI signaling.

Unit 20 interprets receipt of the wink signal as an invitation to outpulse the telephone number of the station that it desires to call, which in this case is the telephone number of unit 21.

A digit of a telephone number is transmitted within the system of FIG. 1 as a series of simulated dial pulses, in which each dial pulse is simulated by toggling between CMI and DMI signaling.

When SCP 40 receives all of the digits of the telephone number, it passes the number to a central switching control point (not shown) within network 30 and receives therefrom a routing number identifying the path from SCP 40 to SCP 50, i.e., path 35. Armed with the routing number, SCP 40 establishes path 35 and transmits to SCP 50 at least the called telephone number. Unit 50, upon receipt of the telephone number, alerts unit 21 to the incoming call by changing the CMI signaling that it is sending to unit 21 to DMI signaling. Unit 21 answers the call by going off-hook (i.e., changing the CMI signaling that it is sending to SCP 50 to DMI signaling). This change in signaling by unit 21 is called answer supervision, which is returned over path 35 to SCP 40. SCP 40, in turn, passes answer supervision to unit 20 by changing the CMI signaling that it is sending that unit to DMI signaling.

At this point, the units proceed to test the transmission quality of the established path pursuant to the invention. Specifically, unit 20, responsive to receipt of answer supervision, transmits to unit 21 a predefined test pattern of binary ones and zeros. Unit 21, in turn, transmits its test pattern upon receipt of the test pattern from unit 20. If unit 20 does not detect any errors in the pattern that it is receiving for a period of, for example, one second, it concludes that the established path is acceptable for the transmission of data and signals its acceptance by, in accordance with the invention, terminating its transmission of the test pattern.

Unit 20 signals its acceptance of the established path by illustratively replacing the test pattern with DMI signaling. Further, in accordance with the invention, unit 20 then waits for a predetermined period of time, e.g., 250 milliseconds, before checking to see if unit 21 is also signaling its acceptance of the established path. Unit 21 signals its acceptance of the path by, in accordance with the invention, terminating its transmission of the test pattern.

If, on the other hand, unit 20 detects an error in the test pattern that it is receiving from unit 21, then it disconnects itself from the established path. Unit 20 disconnects from the path by replacing the test pattern that it is sending to unit 21 with CMI signaling. SCP 40 interprets receipt of CMI signaling as a disconnect and terminates the connection 35 between itself and SCP 50. SCP 50, in turn, transmits CMI signaling to unit 21 as an indication that the call has been disconnected. Based on this occurrence, unit 21 assumes that unit 20 did not receive an error-free transmission of the test pattern that unit 21 sent and replaces the test pattern with CMI signaling.

As seen above, unit 21 operates during the test period very similarly to unit 20. However, since unit 21 is the called station, it operates slightly different than unit 20 does.

Specifically, if unit 21 finds that it did not receive an error-free transmission of the test pattern, then it notifies unit 20 of this fact by, in accordance with the invention, continuing its transmission of the test pattern, and waiting, e.g., 5 seconds, for unit 20 to disconnect from the call. If unit 20 does not do so within the 5 second period, then unit 21 disconnects itself from the call by replacing the test pattern that it is transmitting with CMI signaling. SCP 50, responsive to receipt of CMI signaling, terminates the path 35 between itself and SCP 40. SCP 40, responsive to being disconnected from path 35, replaces the DMI signaling that it is sending to unit 20 with CMI signaling.

If, on the other hand, unit 21 signals its acceptance of the path and unit 20 signals its acceptance within the aforementioned 250 millisecond waiting period, then unit 21 waits an additional period of time, e.g., 250 milliseconds, to see if unit 20 disconnects from the call. If it does not, then unit 21 signals terminal 60 and the user that the call has been completed.

Figure 2:
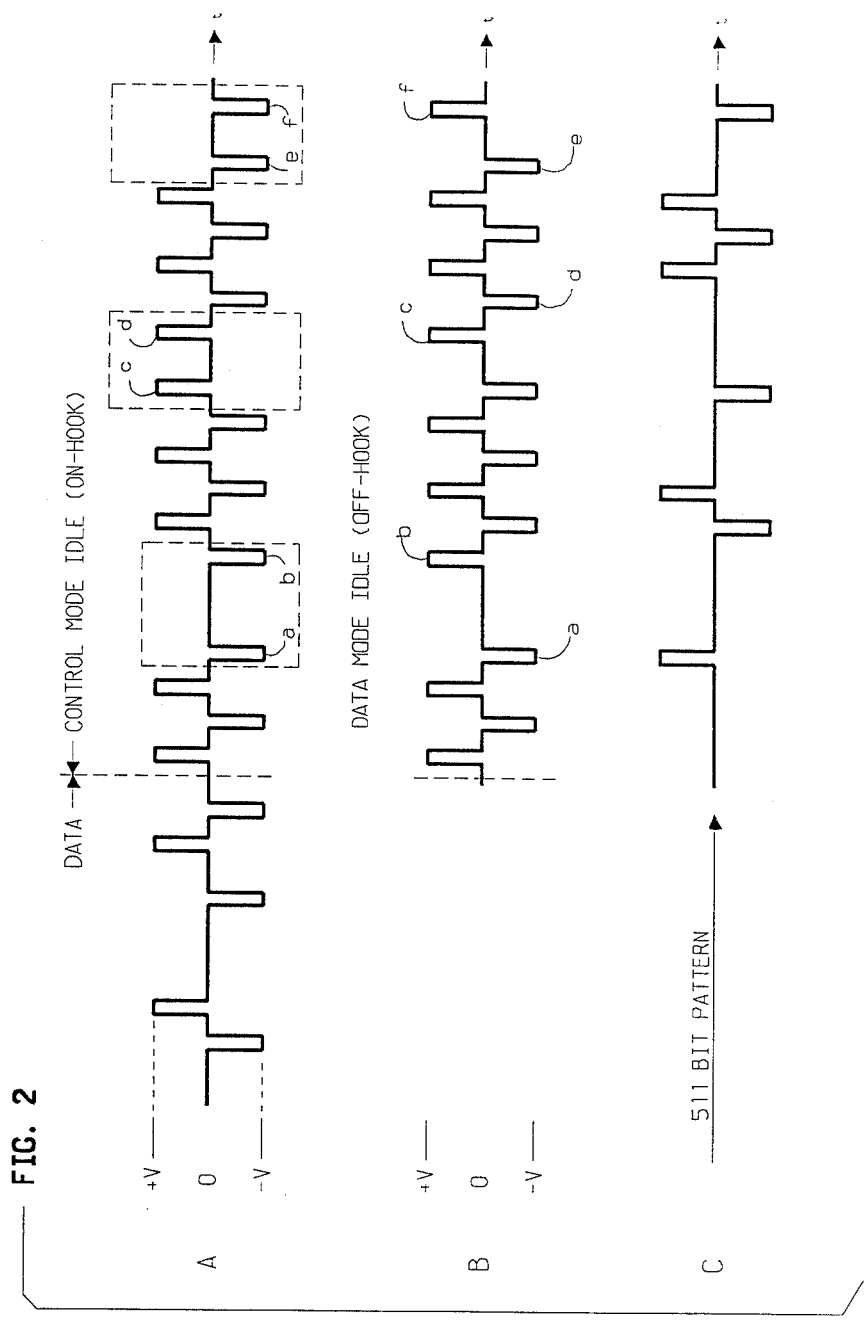
FIG. 2 illustrates examples of supervisory signals and one possible test pattern that may be exchanged between the circuits shown in FIG. 1.

Turning to FIG. 2, the stream of bipolar pulses designated "A" therein illustrates an example of CMI signaling which, it will be remembered, is a form of signaling, in which the bipolar rule is intentionally violated. The rule is violated since the pairs of pulses within the dotted lines, i.e., pulses a and b, c and d, and e and f are of the same polarity, rather than being of opposite polarity, as is shown in the stream of pulses designated "B", which is an example of DMI signaling. The pattern of pulses designated "C" in FIG. 2 is a portion of one possible predefined test pattern that may be transmitted by an interface unit, such as interface units 20 and 21, in order to test the transmission quality of a communication path.

We turn now to a discussion of the hardware and software which implement the present illustrative embodiment of the invention.

Figure 3:
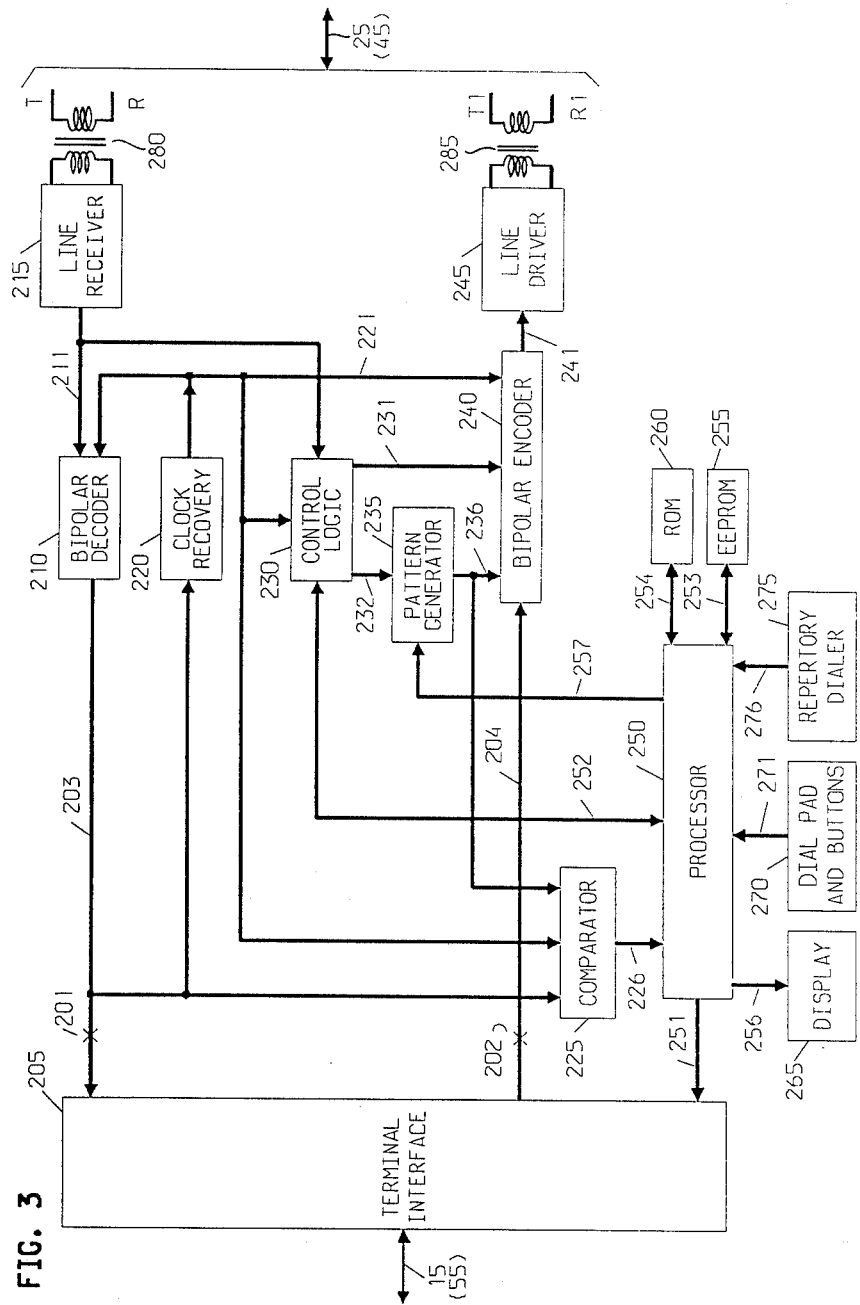
FIG. 3 is a simplified block diagram of the interface unit of FIG. 1 in which the present invention is illustratively implemented.

FIG. 3 shows a simplified block diagram of terminal interface unit 20. As mentioned above, units 20 and 21 are identical to one another. Therefore, in the interest of clarity, the following discussion is directed to unit 20 only, but it pertains equally well to unit 21. In interface unit 20, the receive channel of path 25 connects to leads T and R and the transmit channel thereof connects to leads T1 and R1. Bipolar pulses received over leads T and R are coupled via transformer 280 to line receiver 215 where they are amplified and reshaped before being passed to decoder 210 via lead 211. Decoder 210 converts the bipolar encoded binary ones and zeros into a unipolar format in which a binary one is represented by—illustratively +5 volts—and in which a binary zero is represented by—illustratively zero volts or ground. The reformatted signals are supplied to terminal 10 via interface circuit 205 and contact 201. Contact 201 represents a gating circuit that is inhibited by processor 250 to prevent signals appearing on lead 203 from reaching terminal 10 via circuit 205.

Similarly, contact 202 represents a gating circuit that is inhibited by processor 250 to prevent signals outputted by terminal 10 via circuit 205 from reaching bipolar encoder 240. Signals reaching encoder 240 via either lead 204, 231 or 236 are reformatted into the bipolar format and then passed to line driver 245 via lead 241. Driver 245, in turn, drives transformer 285 in step with the signals that it receives.

Clock recovery circuit 220 extracts a system clock signal from the signals that are outputted by decoder 210 over lead 203 and passes the clock signal to circuits 210, 225, 230 and 240 via lead 221.

Control logic circuit 230, inter alia, monitors the pattern of the signals appearing on lead 211 and notifies processor 250 via one of the leads of bus 252 when the pattern represents either CMI or DMI signaling. Circuit 230 also supplies either CMI or DMI signaling to encoder 240 via lead 231 when it is directed to do so by processor 250 via another one of the leads of bus 252.

Pattern generator outputs via lead 236 the aforementioned predefined test pattern when directed to do so by processor 250 via lead 257, a sample of the pattern being stored in a comparator circuit 225 register via an extension of lead 236. Comparator 225 compares the stored sample with the pattern of the signals that it receives via lead 203 and notifies processor 250 via lead 226 whenever the patterns do not match.

Processor 250 communicates with EEPROM 255 via bus 253 and communicates with ROM 260 via bus 254. EEPROM 255 is used for the storage of, for example, (a) telephone numbers that a user has inputted via dial pad 270 and that are associated with respective buttons on repertory dialer 275 and (b) predefined values that are accessed by processor 250 during an initialization sequence, i.e., a sequence that occurs as result of, for example, recycling power (not shown) applied to unit 20. ROM 260 is used for the storage of processor 250 operating and diagnostic programs as well as the program that implements the invention, as discussed below. Processor 250 also communicates with terminal 10 via multilead bus 251, interface circuit 205 and multilead bus 15, such communications conforming to, for example, the CCITT V.35, appendix 4 signaling interface standard, as mentioned above.

Circuit 270 is a conventional dial (key) pad and includes a plurality of buttons, such as an off-hook button, a dial-it button, a disconnect button, and a button to program (associate) individual buttons on repertory dialer 275 with telephone numbers inputted by the user operating dial pad 270, as mentioned above. A telephone number that has been inputted by the user operating either the dial pad 270 or repertory dialer 275 is displayed on display 265 by processor 250 via display bus 256. Messages relating to signaling and processing calls are also displayed on display 265, as discussed below.

FIG. 4 illustrates a flow chart of a program that is stored in ROM 260 and that is invoked by processor 250 when the user desires to place a call to a particular terminal.

Specifically, when the program is entered at block 300 it proceeds to block 301 where it causes the interface unit to go off-hook by replacing the CMI signaling that is being transmitted with DMI signaling. The program then waits illustratively for the associated switching control point to return the aforementioned wink signal. When the wink signal is received, the program proceeds to block 302 to collect the digits of the telephone number being called by the user. When the last digit of the telephone number has been collected, the program outpulses them one at a time and then waits for answer supervision to be returned by the switching control point. Upon receiving answer supervision, the program proceeds to block 303 where it turns on pattern generator 235 before proceeding to block 304.

At block 304, the program waits illustratively 100 milliseconds to allow the called station time to start transmitting the predefined pattern. The program then clears a processor 250 input register which is incremented by comparator 225 via lead 226 each time the latter circuit detects a mismatch (error) between the pattern of the signals that is being received and the pattern that is being transmitted, as mentioned above. The program then waits illustratively one second before proceeding to block 305 where it determines if the aforementioned register has been incremented by comparator 225. If the program finds the contents of the register to be zero, i.e., the register is clear indicating that the received pattern contained no errors, then the program proceeds to block 307. Otherwise it proceeds to block 306.

At block 306, the program disconnects the call by reverting to the transmission of CMI signaling and displays a message, for example, "CALL FAILED", to that effect.

At block 307, the program signals the called station that the established path is acceptable for data transmission by, in accordance with the invention, terminating its transmission of the test pattern. Block 307 does this by replacing the test pattern with DMI signaling, as discussed above. The program then waits 250 milliseconds before proceeding to block 308.

At block 308, the program determines if the called station is signaling its acceptance of the established path. The program makes this determination by clearing the aforementioned register, waiting a predetermined period of time, e.g., 100 milliseconds and then checking the register to see if comparator 225 has incremented it, thereby signifying that the test pattern is no longer being received from the called station. Block 308 proceeds to block 309 if it finds that to be the case. Otherwise, it proceeds to block 306.

At block 309, the program notifies the associated terminal 10 that it may start transmission of data. The program does this by activating one of the leads, for example, a clear-to-send lead, of cable 15. Block 309 also notifies the user that the call has been completed by displaying a message, for example, "CALL COMPLETED". The program then exits via block 310.

FIG. 5 illustrates in flow chart form a program that is stored in ROM 260 and that is invoked by processor 250 when interface unit 20 answers an incoming call.

Specifically, when the program is entered at block 400 it proceeds to block 401 where it returns answer supervision by replacing the CMI signaling that it is transmitting with DMI signaling. The program then starts a timer, for example, a five-second timer, and proceeds to block 402. At block 402, the program checks to see if it is receiving transmission errors over its respective receive channel in the manner as discussed above, such transmission errors being indicative of the possibility that the calling station has not yet begun transmitting the predefined test pattern. The program proceeds to block 403 if it does not detect an error. Otherwise, it proceeds to block 405.

Blocks 402, 403 and 404 constitute an option in the program which allows the called station to communicate with the calling station even though the latter does not embody the invention.

At block 403, the program returns to block 402 if it finds that it is still within the five-second interval started at block 401. Otherwise it proceeds to block 404. At block 404, the program displays a message, for example, "CALL ANSWERED-NO TEST", to notify the user that an incoming call has been answered. The program then proceeds to block 415 where it connects the associated terminal 10 to the established communication path in the manner discussed above. The program then exits via block 416.

At block 405, the program transmits the test pattern, clears the aforementioned processor 250 register and waits for a period of time, for example, one second before proceeding to block 406. At block 406, the program determines if transmission errors occurred during the wait period. If the program finds that to be the case, then it transfers to block 408. Otherwise, the program proceeds to block 407 to signal its acceptance of the established path by, in accordance with the invention, terminating its transmission of the test pattern. The program then waits—illustratively 250 milliseconds—before proceeding to block 411. At block 411, the program checks to see if the calling station has terminated its transmission of the test pattern and is now signaling that it finds the established communication path acceptable for data transmission. Block 411 makes this determination in same manner as block 305 of FIG. 3 does and proceeds to block 412 if it finds that the calling station is still transmitting the test pattern. Otherwise block 411 proceeds to block 413.

At block 413, the program again waits for a predetermined period of time, e.g., 250 milliseconds, before checking to see if the calling station has disconnected from the call. The program does this by checking to see that it is still receiving DMI signaling and proceeds to block 414 if it finds that to be the case. Otherwise it proceeds to block 412.

At block 414, the program displays a message, for example, "CALL ANSWERED-CHANNEL ACCEPTABLE", and then proceeds to block 415 to connect the associated terminal 10 to the established communication path before exiting via block 416.

At block 408, the program continues to send the predefined test pattern and waits a predetermined period of time, e.g., five seconds, for the calling station to disconnect from the call. The program proceeds to block 409 either at the end of the five-second period or upon receipt of the disconnect signal (i.e., CMI signaling), whichever occurs first.

At block 409, the program displays a message, for example, "CALL NOT COMPLETED-REC'V ERRORS" to notify the user that an incoming call was not completed. The program then proceeds to block 410 where it disconnects from the call by transmitting CMI signaling to its associated switching control point before exiting via block 416.

At block 412, the program displays a message, for example, "CALL NOT COMPLETED-CHANNEL ERRORS" to notify the user that the call has been terminated and the reason for doing so. The program then proceeds to block 410 to disconnect from the call.

The foregoing is merely illustrative of the principles of my invention. Those skilled in the art will be able to devise numerous arrangements which, although not explicitly shown or described herein, embody those principles and are within their spirit and scope.

What is claimed is:

1. An arrangement for signaling over a communication path, said arrangement comprising,
    a first circuit connected to one end of said path and a second circuit connected to another end of said path, said first circuit being arranged to transmit to said second circuit a predetermined sequence of signals and said second circuit being arranged to transmit to said first circuit a predetermined sequence of signals,
    signaling means in said first circuit responsive to the absence of an error in the sequence of signals received from said second circuit over a predetermined period of time for causing said first circuit to terminate its signal transmission and responsive to the presence of from said path, and
    signaling means in said second circuit responsive to the absence of an error in the sequence of signals received from said first circuit over a predetermined period of time for causing said second circuit to terminate its signal transmission and responsive to the presence of such an error for causing said second circuit to continue its transmission of the sequence of signals.

2. The arrangement set forth in claim 1 wherein said first circuit signaling means includes means responsive to receipt of the sequence of signals from said second circuit for a predetermined period of time after said first circuit has terminated its transmission of the sequence of signals for causing said first circuit to disconnect from said path.

3. The arrangement set forth in claim 1 wherein said second circuit signaling means includes means responsive to receipt of an indication that said first circuit has disconnected from said path for causing said second circuit to terminate its continuing transmission of the sequence of signals and to disconnect itself from said path.

4. The arrangement set forth in claim 1 wherein said second circuit further includes means for terminating its continuing transmission of said sequence upon receipt of an indication that said first circuit has disconnected from said path.

5. An arrangement for signaling over a communication path, said arrangement comprising,
    first and second circuits connected to respective ends of said communication path, each of said circuits being arranged to transmit a predefined sequence of signals to each other over said path, and
    means contained in each of said circuits for determining if the sequence of signals that they receive from each other contains at least one error and for providing an indication of the results of their respective determinations, said first circuit being arranged to terminate its transmission of the sequence of signals when the results of its determination indicate the absence of an error and to disconnect itself from said path when its results indicate the presence of an error, said second circuit being arranged to terminate its transmission of the sequence of signals when the results of its determination indicate the absence of an error and to continue the transmission of the sequence of signals when its results indicate the presence of an error.

6. The arrangement set forth in claim 5 wherein the means for determining in said first circuit includes means responsive to receipt of said sequence from said second circuit after a predetermined period of time has expired for disconnecting said first circuit from said path even though the results of said first circuit determination indicate the absence of an error.

7. The arrangement set forth in claim 5 wherein said second circuit terminates its continuing transmission of said sequence and disconnects itself from said path upon receipt of an indication that said first circuit has disconnected from said path.

8. An arrangement for signaling over a communication path, said arrangement comprising a first circuit connected to one end of said path and a second circuit connected to another end of said path, said first and second circuits being arranged to transmit a predefined sequence of signals to each other over said path, and means in at least one of said circuits for determining if said path is acceptable for the transmission of other signals based on the absence of an error in the sequence of signals that said one circuit receives from the other circuit, said one circuit being arranged to terminate its transmission of said sequence as an indication that said path is acceptable when said determination indicates the absence of an error and to continue said transmission as an indication that said path is unacceptable when said determination indicates the presence of an error.

9. A signaling arrangement for use in a switched digital network comprising a first circuit, said first circuit being arranged to transmit to said network signals indicative of a telephone number, a second circuit having a telephone number assigned thereto, said network being arranged to establish a communication path between said first and second circuits upon receipt of said assigned telephone number from said first circuit, first circuit means responsive to receiving an indication from said network that said path is established for transmitting to said second circuit a predefined sequence of signals, second circuit means responsive to receipt of said sequence for transmitting to said first circuit a predefined sequence of signals, first circuit means for determining if the sequence of signals that it receives over a predetermined period of time contains an error, said first circuit being arranged to terminate its transmission of the sequence of signals if an error is absent and to disconnect itself from said path if an error is present, second circuit means for determining if the sequence of signals that it receives over a predetermined period of time contains an error, said second circuit being arranged to terminate its transmission of the sequence of signals if an error is absent and to continue its transmission of the sequence if an error is present, said first circuit responsive to continued receipt of said sequence from said second circuit disconnecting itself from said path even though the means for determining in said first circuit has found an error to be absent, said second circuit disconnecting itself from said path upon receipt of an indication from said network that said first circuit has disconnected from said path.

* * * * *

UNITED STATES PATENT AND TRADEMARK OFFICE
CERTIFICATE OF CORRECTION

PATENT NO. : 4,736,402
DATED : April 5, 1988
INVENTOR(S) : Edward W. Landis

It is certified that error appears in the above-identified patent and that said Letters Patent is hereby corrected as shown below:

```
Column 2, line 63, "viceversa" should read --vice-versa--.
Column 8, line 15, after "of" add --such an error for causing
said first circuit to disconnect--.
```

Signed and Sealed this

Sixth Day of December, 1988

Attest:

DONALD J. QUIGG

Attesting Officer

Commissioner of Patents and Trademarks